United States Patent [19]

Blackschleger

[11] 4,387,692

[45] Jun. 14, 1983

[54] PETROLEUM PREHEATING DEVICE FOR ENGINES

[76] Inventor: Douglas H. Blackschleger, 304 W. Allen Ave., San Dimas, Calif. 91773

[21] Appl. No.: 226,234

[22] Filed: Jan. 19, 1981

[51] Int. Cl.³ .......................................... F02M 31/00
[52] U.S. Cl. ..................................... 123/557; 165/51
[58] Field of Search ..................... 123/557; 165/51, 52

[56] References Cited

U.S. PATENT DOCUMENTS

| | | | |
|---|---|---|---|
| 1,005,395 | 10/1911 | Wohl | 123/557 |
| 1,195,179 | 8/1916 | Blair | 165/52 |
| 1,322,429 | 11/1919 | Gooding | 165/52 |
| 2,617,633 | 11/1952 | Bosch | 123/557 |
| 4,027,639 | 6/1977 | Amano | 123/557 |
| 4,167,969 | 9/1979 | Ritzenthaler | 165/51 |
| 4,232,421 | 11/1980 | Tucker | 123/557 |
| 4,237,850 | 12/1980 | Connor | 123/557 |

FOREIGN PATENT DOCUMENTS

| | | | |
|---|---|---|---|
| 960534 | 1/1975 | Canada | 123/557 |
| 405990 | 12/1940 | Fed. Rep. of Germany | 165/52 |
| 581512 | 12/1924 | France | 123/557 |
| 1025689 | 4/1953 | France | 123/557 |

Primary Examiner—Ronald H. Lazarus

[57] ABSTRACT

The present invention relates to a system for achieving improved fuel consumption of internal combustion engines. Both water cooled gasoline and diesel engines are considered as applicable for the utilization of this invention. This invention provides an added segment to the typical fuel line of such engines. Such added segment consists of an elongated U-shaped loop which passes through a cover seal of a typical freeze plug, carrying the fuel line into the coolant chamber of the engine between the cylinders of the engine. The highly elevated temperatures of such coolant are used to transfer heat to the fuel prior to the fuel being delivered to the combustion chamber, thereby preheating the fuel and enabling more efficient combustion.

2 Claims, 3 Drawing Figures

U.S. Patent      Jun. 14, 1983      4,387,692
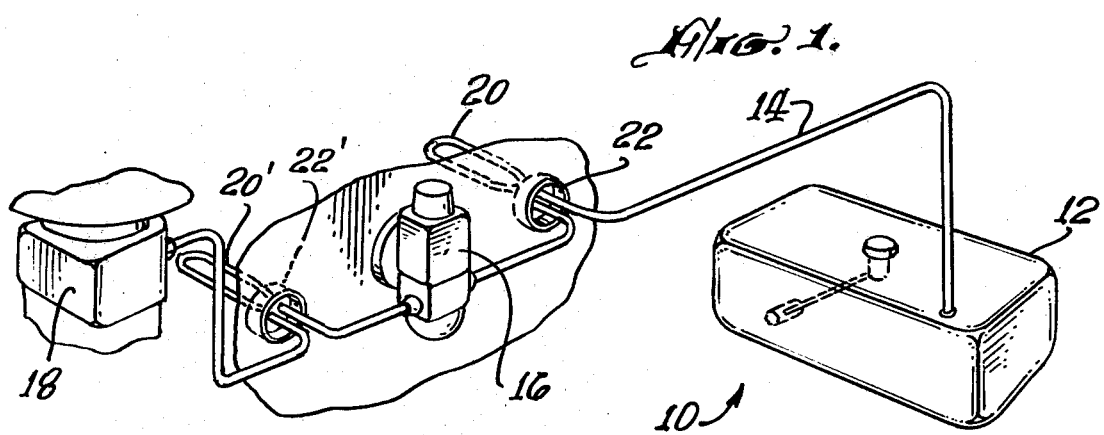
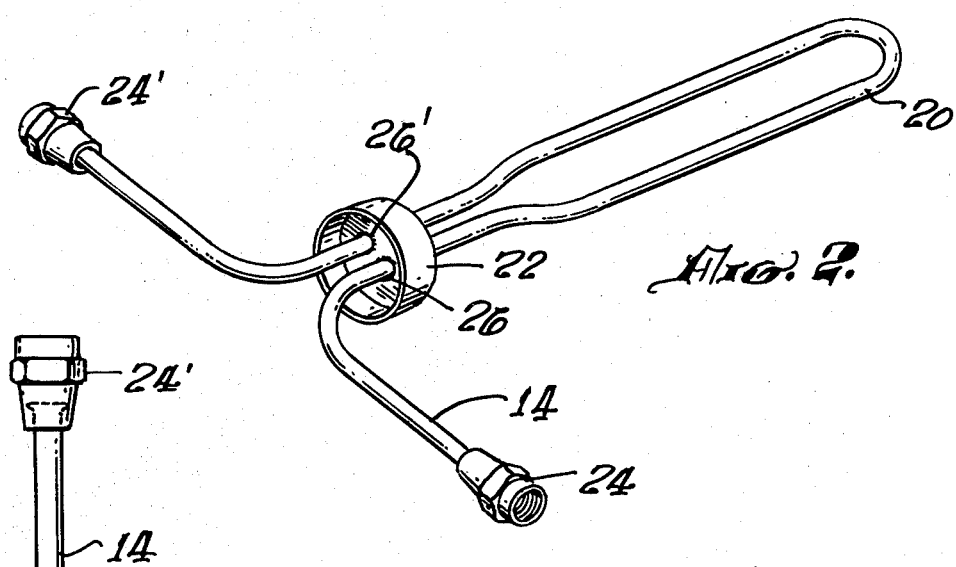
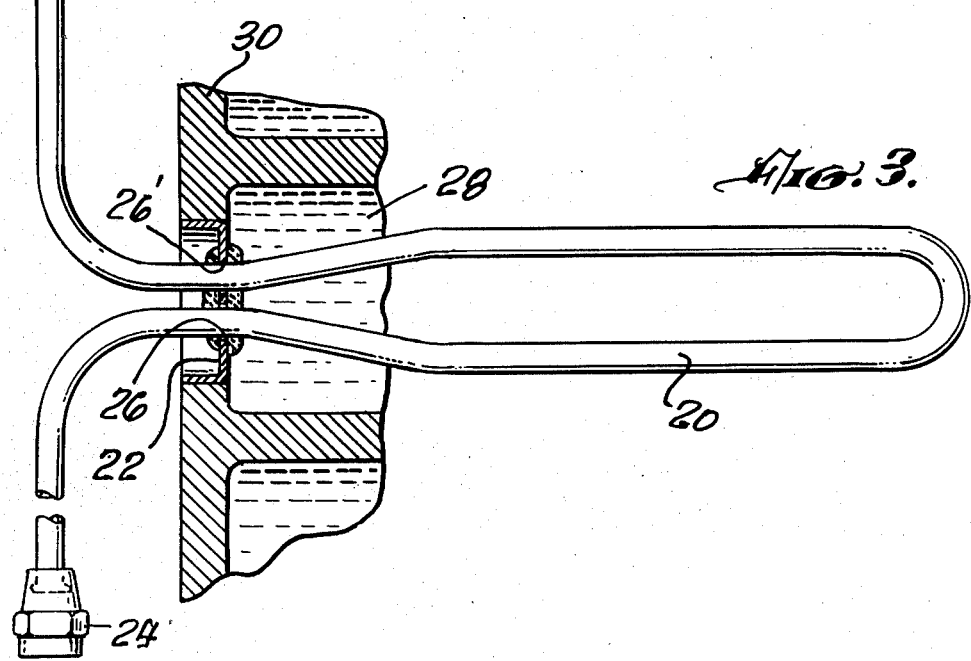

PETROLEUM PREHEATING DEVICE FOR ENGINES

BACKGROUND OF THE INVENTION

It has become well understood that the combustion efficiency of gasoline and diesel fuels is increased by adding heat energy prior to ignition. In such systems, less fuel can be utilized to provide the necessary energy output. Some investigations report nearly 5-fold increases in mileage performance through the use of preheated fuel.

The present invention presents a simple method and apparatus to achieve fuel preheating through the use of available engine heat. It is configured such that it can readily be incorporated into existing engine designs without costly or extensive modification.

SUMMARY OF THE INVENTION

In the typical fuel supply system of internal combustion engines, the fuel from the storage tank is drawn by pump means through a fuel line and delivered to the carburetor or fuel injection mechanism wherein it is mixed with an appropriate volume of air, and the mixture is then introduced into the intake manifold for distribution into the combustion chambers of the several cylinders.

Recent developments, which expand upon the standard supercharger concepts, have included use of the exhaust gases for introducing heat energy into the fuel-air mixture prior to its introduction into the combustion chamber.

The present invention concerns the introduction of an added segment into the fuel line. Said segment includes fluid-tight coupling means at each end to enable the segment to be joined into the fuel line. The segment provides a generally U-shaped extension which passes through a specially adapted freeze plug which permits the U-shaped extension to be located within the coolant cavity of a typical engine block. Fuel from the fuel tank passes through the fuel line, enters into the segment of this invention, passes through the freeze plug and into the U-shaped extension, returns through the freeze plug and rejoins the standard fuel line enroute to the manifold for distribution to the combustion chambers. While passing through the U-shaped extension within the engine block, the fuel is elevated in temperature by heat transfer mechanisms through the walls of the fuel line forming the U-shaped extension. The introduction of this heat energy into the fuel increases the combustion efficiency of the fuel, thereby reducing the quantity of fuel necessary to operate the engine.

BRIEF DESCRIPTION OF THE DRAWINGS

FIG. 1, illustrates, schematically, the typical fuel line arrangement, with a pair of the present inventions introduced therein.

FIG. 2 depicts a perspective view of the present invention.

FIG. 3 shows a partial sectional view of an engine block with the present invention installed therein.

DESCRIPTION OF THE INVENTION

While the herein descriptions and illustrations consider the principal embodiment of the present invention, the inventor envisions further embodiments and alternatives which are within the scope of these drawings and description, and said inventor considers such alternates to be within the claims hereinafter included.

Referring now to FIG. 1, a fuel delivery system 10 is shown wherein fuel from a fuel tank 12 is drawn through a fuel line 14 by fuel pump means 16 and is delivered to a carburetor 18. In the present invention, U-shaped extensions 20, 20' are introduced into the fuel line 14 such that they cause the fuel to pass into and out of the engine block, illustrated for reference, through freeze plugs 22, 22'. While passing through the engine block, the fuel within the U-shaped extensions 20, 20' is heated by typical heat transfer mechanisms.

Referring now to FIG. 2, the configuration on one of the U-shaped extensions 20 is shown in perspective. In the principal embodiment it is configured to be a segment that may be added to the fuel line by fluid-tight coupling means 24, 24' which mate with similar coupling means on the fuel line.

The fuel line 14 passes from the coupling means 24 through a hole 26 in the freeze plug 22 and is then formed into an elongated U-shape extension 20 before passing back through the freeze plug 22 through a second hole 26'. The fuel line 14 then proceeds to the second fluid-tight coupling means 24' whereat it is joined to the existing fuel line system of the referenced engine. Referring now to FIG. 3, the U-shaped extension 20 is illustrated as being inserted into the coolant cavity 28 of the referenced engine block 30. The integrity of the said coolant cavity 28 is retained by means of the freeze plug 22 which is rigidly inserted into its receptacle by standard means. The holes 26, 26' in the freeze plug 22 through which the fuel line 14 pass are sealed in a similar manner.

The inward extent of the U-shaped extension 20 is such that no direct contact is made with any internal surfaces of the engine block or cylinder walls. The coolant contained within the coolant cavity 28 of the engine block 30 surrounds the U-shaped extension 20 of the fuel line 14. Heat absorbed by the coolant medium from the combustion occurring within the cylinders of the engine is partially transferred by heat transfer mechanisms to the fuel passing through the U-shaped extension 20.

Referring now to all of the illustrations, this inventor envisions that one or more of the U-shaped extensions 20 may be introduced within the fuel line 14 as is necessary to elevate the fuel temperature to maximize the efficiency of combustion of such fuel. Said plurality of U-shaped extensions 20 is limited only by the availability of freeze plugs 22 in the engine block.

For these and other presents I claim:

1. In an internal combustion engine system having, inter alia, an engine block containing a coolant cavity which surrounds the cylinder walls of such an engine system, and which engine block contains a plurality of openings through the block walls or base into the said coolant cavity, each of said openings being normally sealed by freeze plugs forced fit and welded or braised in place, the improvement of the introduction, in series, of a plurality of generally elongated U-shaped extensions into the fuel line between the fuel reservoir and the carburetor of such an engine system, such that each such U-shaped extension is situated so as to pass into the coolant cavity of the engine block and returning therefrom through specially adapted freeze plugs, each such U-shaped extension utilizing a different one of the freeze plug openings as its access to said coolant cavity, and each such U-shaped extension being welded or braised into the central portion of such specially adapted freeze plugs to provide sealing for the coolant cavity when installed.

2. The improvement of the internal combustion engine system of claim 1 wherein the plurality of U-shaped extensions is one.

* * * * *